(12) United States Patent
Rapp et al.

(10) Patent No.: US 11,787,355 B2
(45) Date of Patent: Oct. 17, 2023

(54) PROTECTION CIRCUITRY AND A METHOD FOR PROTECTING A VEHICLE POWER SUPPLY

(71) Applicant: KNORR-BREMSE Systeme fuer Nutzfahrzeuge GmbH, Munich (DE)

(72) Inventors: Tamas Rapp, Budapest (HU); Benedek Pour, Budapest (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 406 days.

(21) Appl. No.: 17/276,976

(22) PCT Filed: Sep. 5, 2019

(86) PCT No.: PCT/EP2019/073657
§ 371 (c)(1),
(2) Date: Mar. 17, 2021

(87) PCT Pub. No.: WO2020/057988
PCT Pub. Date: Mar. 26, 2020

(65) Prior Publication Data
US 2022/0024396 A1 Jan. 27, 2022

(30) Foreign Application Priority Data
Sep. 18, 2018 (EP) .................... 18195119

(51) Int. Cl.
*B60R 16/023* (2006.01)
*B60R 16/033* (2006.01)
(Continued)

(52) U.S. Cl.
CPC ........ *B60R 16/0232* (2013.01); *B60R 16/033* (2013.01); *B60W 50/029* (2013.01);
(Continued)

(58) Field of Classification Search
CPC ............. B60R 16/0232; B60R 16/033; B60W 50/029; B60W 2050/0002; B60W 2050/0292
(Continued)

(56) References Cited

U.S. PATENT DOCUMENTS 4,642,479 A 2/1987 Lombardi et al.
9,350,253 B1 5/2016 Zielger et al.
(Continued)

FOREIGN PATENT DOCUMENTS

CN 102541016 A 7/2012
CN 107618464 A 1/2018
(Continued)

OTHER PUBLICATIONS

Japanese-language Office Action issued in Japanese Application No. 2021-538914 dated Jul. 5, 2022 with English translation (six (6) pages).
(Continued)

*Primary Examiner* — Michael R. Fin
(74) *Attorney, Agent, or Firm* — Crowell & Moring LLP

(57) ABSTRACT

Protection circuitry for a vehicle power supply with storage units includes at least a first output circuit and a second output circuit for providing power to the storage units. At least a first microcontroller and a second microcontroller are each adapted to prevent the first output circuit or the second output circuit, or both, from providing power.

7 Claims, 1 Drawing Sheet

(51) Int. Cl.
  *B60W 50/029* (2012.01)
  *B60W 50/00* (2006.01)
(52) U.S. Cl.
  CPC ............. *B60W 2050/0002* (2013.01); *B60W 2050/0292* (2013.01)
(58) Field of Classification Search
  USPC ....................................... 307/9.1, 10.1, 10.6
  See application file for complete search history.

(56) References Cited

U.S. PATENT DOCUMENTS

| | | | |
|---|---|---|---|
| 2005/0052081 A1 | 3/2005 | Sayama | |
| 2014/0361730 A1* | 12/2014 | Kung | H02M 3/1584 320/107 |
| 2016/0129864 A1 | 5/2016 | Essenmacher | |
| 2016/0290305 A1 | 10/2016 | Kinoshita | |
| 2018/0015892 A1 | 1/2018 | Aoki | |
| 2018/0029474 A1 | 2/2018 | Berels et al. | |
| 2018/0032413 A1 | 2/2018 | Naganathan | |
| 2018/0222411 A1 | 8/2018 | Aoki | |
| 2018/0222412 A1* | 8/2018 | Aoki | B60R 16/033 |
| 2019/0344762 A1* | 11/2019 | Alfter | B60T 8/17 |

FOREIGN PATENT DOCUMENTS

| | | |
|---|---|---|
| CN | 107681757 A | 2/2018 |
| CN | 108418264 A | 8/2018 |
| CN | 108422954 A | 8/2018 |
| DE | 10 2017 116 883 A1 | 2/2018 |
| DE | 10 2016 015 544 A1 | 6/2018 |
| JP | 2015-217734 A | 12/2015 |
| JP | 2018-129964 A | 8/2018 |
| WO | WO 2011/023215 A1 | 3/2011 |

OTHER PUBLICATIONS

International Search Report (PCT/ISA/210) issued in PCT Application No. PCT/EP2019/073657 dated Nov. 27, 2019 with English translation (two (2) pages).
Written Opinion (PCT/ISA/237) issued in PCT Application No. PCT/EP2019/073657 dated Nov. 27, 2019 (six (6) pages).
Extended European Search Report issued in European Application No. 18195119.5 dated Mar. 21, 2019 (eight (8) pages).
European Office Action issued in European Application No. 18195119.5 dated Jul. 14, 2022 (eight (8) pages).
Julian et al., "Operating Standby Redundant Controller to Improve Voltage-Source Inverter Reliability," IEEE Transactions on Industry Applications, Sep. 1, 2010, pp. 2008-2014, vol. 46, No. 5 XP011313119 (seven (7) pages).
Chinese-language Office Action issued in Chinese Application No. 201980061045.0 dated Apr. 21, 2023 with English translation (16 pages).
Communication pursuant to Article 94(3) EPC issued in European Application No. 18 195 119.5 dated Jul. 14, 2022 (eight (8) pages).
Julian A et al.: "Operating Standby Redundant Controller to Improve Voltage-Source Inverter Reliability", IEEE Transactions On Industry Applications, IEEE Service Center, Sep. 1, 2010, pp. 2008-2014, vol. 46, No. 5, Piscataway, NJ, US, XP011313119, ISSN: 0093-9994 (seven (7) pages.

* cited by examiner

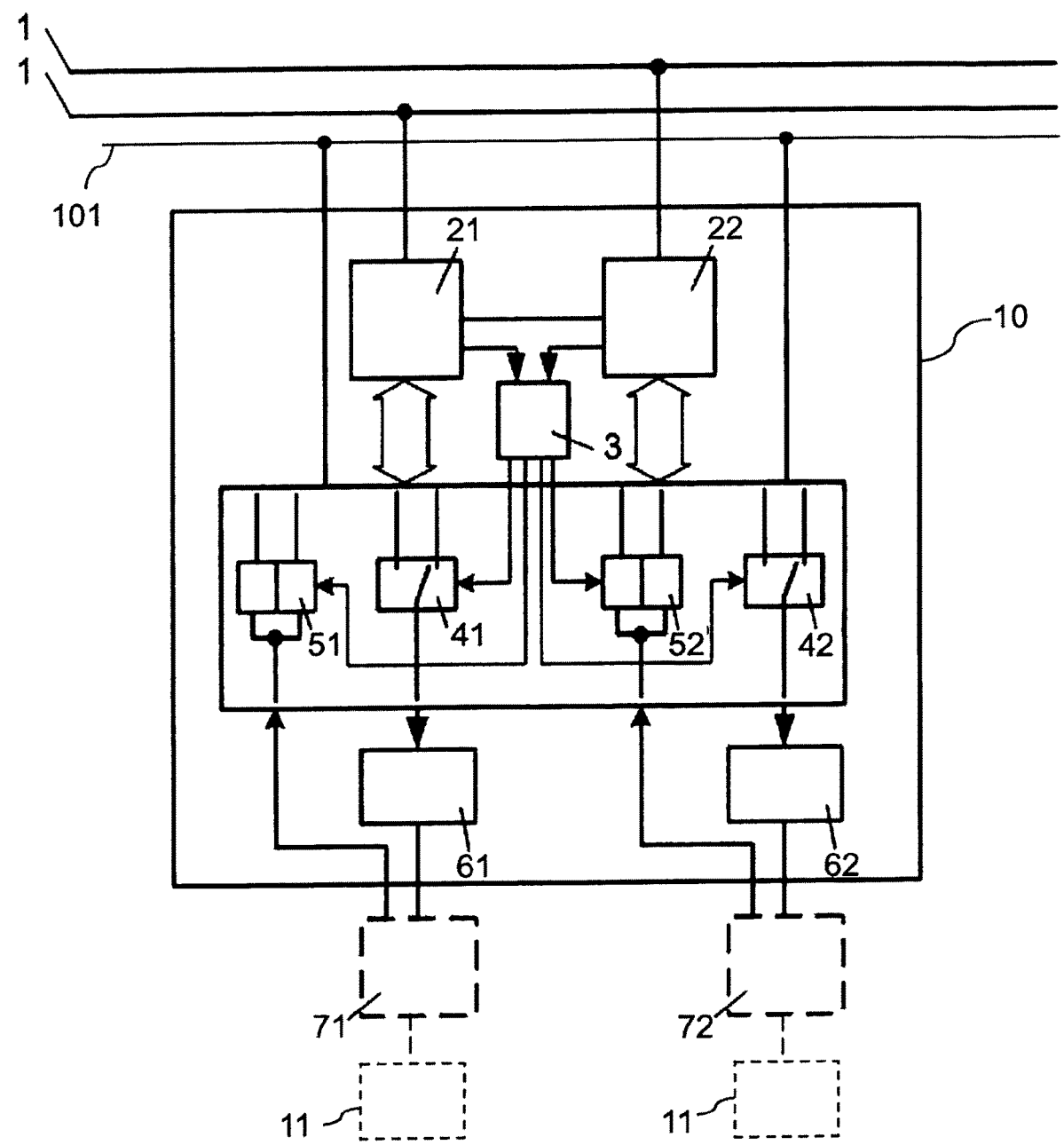

PROTECTION CIRCUITRY AND A METHOD FOR PROTECTING A VEHICLE POWER SUPPLY

BACKGROUND AND SUMMARY OF THE INVENTION

The present invention relates to protection circuitry for a vehicle power supply, a method for protecting the vehicle power supply and, in particular, to a circuit protection and separation for a redundant electric power supply system.

A conventional control unit is disclosed in DE 10 2016 015 544 A1, wherein two output circuits are used for the actuation of an electric parking brake. Another conventional system is disclosed in DE 10 2017 116 883 A1, wherein a redundant microcontroller architecture communicates over a redundant communication network of a vehicle. This system uses in particular an interlink between the communicating microprocessors which are operable as a master and a slave processor.

However, there is a demand for further protection circuits that can be integrated in safety relevant applications in commercial vehicles, such as for braking, steering or autonomous driving applications. In particular, there is a demand for a protection provided by a safe separation of all components in case of any failure.

At least some of these problems are overcome by a protection circuitry and by a method for protecting a vehicle power supply according to independent claims.

Embodiments of the present invention relate to protection circuitry suitable for a vehicle power supply that includes storage units. The protection circuitry includes at least a first output circuit and a second output circuit for providing power to the storage units. The protection circuitry further includes at least a first microcontroller and a second microcontroller, each of which is adapted to prevent the first output circuit or the second output circuit or both from providing power.

The vehicle power supply may include one or more electric storage cells (e.g. batteries) that are charged through the board or vehicle power network. The vehicle power supply is, for example, adapted to receive power through a vehicle power and communications network (board network).

Optionally, the protection circuitry includes at least a first safety switch and a second safety switch (or more). The first safety switch may be adapted to separate (e.g. disconnect) the first output circuit from the vehicle power network, and the second safety switch may be adapted to separate (disconnect) the second output circuit from the vehicle network.

The protection circuitry may further include a logic circuit coupled to the first microcontroller and to the second microcontroller. The logic circuit may enable control of the first safety switch and of the second safety switch through either the first microcontroller or through the second microcontroller. For this, the logic circuit may comprise an XOR logic gate. Optionally, the logic circuit is further adapted to cause a separation of first output circuit and/or of the second output circuit based on control signals from the first microcontroller independently of a state of the second microcontroller. The logic may also be adapted to cause a separation of first output circuit and/or of the second output circuit based on control signals from the second microcontroller independently of a state of the first microcontroller. Hence, the protection circuitry remains completely operational—even in case that one of the microcontrollers ceases to operate.

The protection circuitry may further include (at least) a first transceiver and a second transceiver for receiving feedback information from the storage units and for transmitting/forwarding the feedback information to the first microcontroller and/or the second microcontroller and/or the vehicle power and communication network.

Embodiments of the present invention further relate to a system for providing redundant electric power to at least one vehicle component (consumer). The system includes at least one protection circuitry as defined before connectable to the vehicle power network and to the vehicle communication network. The system further includes one or more storage units coupled to the at least one protection circuitry for receiving electric power to be stored in the one or more storage units. The at least one vehicle component may be connectable to at least two storage units to enable the redundant electric power supply.

Embodiments of the present invention further relate a vehicle, in particular a commercial vehicle, with a system for providing redundant electric power as defined before.

Embodiments of the present invention further relate to a method for protecting a vehicle power supply. The method comprises the steps of:
 providing power through at least a first output circuit and/or a second output circuit to the storage units; and
 interrupting the power supply through the first output circuit or through the second output circuit or through both based on a control by a first microcontroller or a second microcontroller.

This method or part thereof may also be implemented or caused by software or a computer program product installed on a computer or processing unit (e.g. an electronic control unit of the vehicle). Therefore, embodiment relate also to a computer program having a program code for performing the method or causing it, when the computer program is executed on a processor.

Embodiments provide the advantage of enabling a protection of the power supply for a vehicle, wherein the output circuits connected to electric energy storage units can be separated or disconnected when a failure occurs. In particular, the affected circuit can be separated, because of the redundancy provided by the two independent microcontrollers. Hence, a protection of other circuits from any malfunctioning of one component is ensured.

Some examples of the circuitry and/or methods will be described in the following by way of examples only, and with respect to the accompanying FIGURE.

BRIEF DESCRIPTION OF THE DRAWING

FIG. 1 depicts protection circuitry for a vehicle power supply according to an embodiment of the present invention.

DETAILED DESCRIPTION OF THE DRAWING

FIG. 1 depicts protection circuitry 10 for a vehicle power supply that includes a plurality of storage units 71, 72 with storage elements such as battery cells and an optional logic. The power is supplied through a (redundant) vehicle power network 101 and is provided to the storage units through at least two output circuits 61, 62 thus enabling a desired redundancy. The communication is provided through the vehicle communication network 1.

The protection circuitry 10 comprises a first microcontroller 21 and a second microcontroller 22, both coupled to a logic circuit 3. The protection circuitry 10 further comprises a first safety switch 41 and a second safety switch 42 that are controlled by the first microcontroller 21 or the second microcontroller 22 through the logic circuit 3 and are configured to open and close a respective connection from the vehicle power network 101. The protection circuitry 10 further comprises a first output circuit 61, a second output circuit 62, a first transceiver 51, and a second transceiver 52. The first output circuit 61 couples to the first safety switch 41 which is arranged between the first output circuit 61 and the vehicle power network 101. Similarly, the second safety switch 42 is arranged between the vehicle power network 101 and the second output circuit 62. Hence, the first safety switch 41 and/or the second safety switch 42 are able to disconnect the first output circuit 61 and/or the second output circuit 62 from the power supply.

The protection circuitry 10 of FIG. 1 couples to at least two intelligent storage units 71, 72 that receive the power from the first output circuit 61 and/or the second output circuit 62. Moreover, the protection circuitry 10 provides a feedback line from the first intelligent storage unit 71 to the first transceiver 51 and, similarly, from the second intelligent storage unit 72 to the second transceiver 52. The first and second transceivers 51, 52 are adapted to receive the feedback information from the first intelligent storage unit 71 and from the second intelligent storage unit 72 and provide this information to the first microcontroller 21 and/or to the second microcontroller 22 (or directly to the vehicle communication network 1). The first transceiver 51 and the second transceiver 52 are likewise controlled via the logic circuit 3 by the first microcontroller 21 and/or the second microcontroller 22.

According to embodiments of the present invention, the first microcontroller 21 (and similarly the second microcontroller 22) is configured to disconnect either the first output circuit 61 or the second output circuit 62, or both of them, from the power supply by controlling the respective safety switches 41, 42. Therefore, embodiments of the present invention provide a complete redundant protection circuitry 10, wherein each of the at least two microcontrollers 21, 22 coupled to a redundant vehicle power and communication network 1, 101 are capable of controlling the at least two output circuits 61, 62 providing respective power to the intelligent storage units 71, 72.

Possible consumers such as vehicle components 11 (e.g. safety relevant applications) that receive the electric power from the intelligent storage units 71, 72 may be connected directly to the intelligent storage units 71, 72. Therefore, if the first intelligent storage unit 71 or the second intelligent storage unit 72 exhibits a failure, the redundant protection circuitry 10 still ensures sufficient power for the safety relevant application 11 connected to the first and to the second intelligent storage unit 71, 72.

The protection circuitry 10 according to embodiments represent thus an electric energy management unit (central unit) for managing a redundant power supply, in particular, for safety relevant applications 11. Since also the power and communication network 1, 101 itself may be set up in a redundant way (see two lines/buses in FIG. 1), the vehicle has two independent systems that do not interfere in case of any failure in one component.

According to further embodiments, the redundant microcontrollers 21, 22 are configured to control any number of electric output circuits 61, 62 and provide corresponding status information to the redundant vehicle communication network 1. If there are more than two output circuits 61, 62 and/or more than two (intelligent) storage units 71, 72, the output circuits 61, 62 and/or the intelligent storage units 71, 72 can be grouped together to be controlled by the first microcontroller 21 and/or by the second microcontroller 22. In this case, additional safety switches may be provided to enable a separation of any or groups of the output circuits 61, 62, . . . . As set out before, the first microcontroller 21 and the second microcontroller 22 use the logic circuit 3 to control the components of the protection circuitry 10 such as the all safety switches, all output circuits and/or all transceivers.

Both microcontrollers 21, 22 provide advantageously a redundant control and information management, also for the feedback from the intelligent storage units 71, 72 via the transceivers 51, 52. The logic circuit 3 ensures that both microcontrollers 21, 22 do not interfere with one another and are operable independently from each other. This may be ensured by providing enabling signals by the first and second microcontrollers 21, 22 to the decision logic 3 to specify which of the microcontrollers 21, 22 controls which of the output circuits 61, 62. If a failure in the system occurs, the microcontrollers 21, 22 share a control over the output circuits 61, 62 defined during initialization. In case the commanding microcontroller exhibits a failure, the other microcontroller 21, 22 is able to take over the control of the affected output circuit 61, 62 and to separate (disable) the failed circuit over the decision logic circuit 3 and the corresponding safety switch 41, 42.

It is furthermore of particular advantage that the output circuits 61, 62 provide each microcontroller 21, 22 with respective feedback signals from the electric storage units 71, 72. Based thereon, the microcontrollers 21, 22 can control each of the output circuits 61, 62. It is also of advantage if the number of transceivers 51, 52 equals the number of microcontrollers 21, 22 to provide the feedback information to the respective microcontrollers. According to further embodiments, all transceivers 51, 52 are able to provide the feedback information to each of the microcontrollers 21, 22 at the same time.

Further advantageous embodiments relate to the following subject matters:

A redundant electric energy management system with multiple output circuits and at least two microcontrollers, wherein each microcontroller is able to disconnect the circuit power outputs independently;

A corresponding redundant electric energy management system, wherein the circuit separation is realized by a safety switch in each circuit;

A corresponding redundant electric energy management system, wherein the circuit separation safety switch 4 is controlled by a decision logic circuit 3.

A corresponding redundant electric energy management system, wherein the decision logic circuit 3 is able to switch off the circuit power output by any of the microcontrollers regardless the last output value from the other microcontroller.

A corresponding redundant electric energy management system, wherein the decision logic circuit 3 is realized using XOR logic gates.

A corresponding redundant electric energy management system, wherein each microcontroller is provided with feedback signals from the safety energy storage units 7 in parallel by appropriate transceivers 5.

The description and drawing merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 1 vehicle communication network
3 logic circuit
10 protection circuitry
11 vehicle component (consumer)
21, 22 microcontroller(s)
41, 42 safety switches (switching units)
51, 52 transceiver(s)
61, 62 output circuit(s)
71, 71 storage unit(s)
101 vehicle power network

The invention claimed is:

1. A protection circuitry for a vehicle power supply that includes storage units, comprising:
  at least a first output circuit and a second output circuit for providing power to the storage units;
  at least a first microcontroller and a second microcontroller, wherein
  each of the first and second microcontrollers are adapted to prevent the first output circuit or the second output circuit, or both, from providing power; and
  a logic circuit coupled to the first microcontroller and to the second microcontroller, wherein the logic circuit is configured to enable control of a first safety switch and of a second safety switch by either the first microcontroller or by the second microcontroller, and wherein the logic circuit comprises an XOR logic gate.

2. The protection circuitry according to claim 1, wherein the vehicle power supply is adapted to receive power through a vehicle power and communications network, further comprising:
  the first safety switch and the second safety switch,
  wherein the first safety switch is adapted to separate the first output circuit from the vehicle power network and the second safety switch is adapted to separate the second output circuit from the vehicle power network.

3. The protection circuitry according to claim 1, wherein the logic circuit is adapted to cause a separation of the first output circuit and/or the second output circuit by using one of the first and second microcontrollers independently of a state of the respective other of the first and second microcontrollers.

4. The protection circuitry according to claim 1, further comprising:
  a first transceiver and a second transceiver for receiving feedback information from the storage units and for transmitting the feedback information to at least one of: the first microcontroller, the second microcontroller, or the vehicle power and communication network.

5. A system for providing redundant electric power to at least one vehicle component, comprising:
  at least one protection circuitry comprising:
    at least a first output circuit and a second output circuit for providing power to the storage units;
    at least a first microcontroller and a second microcontroller, each of the first and second microcontrollers being adapted to prevent the first output circuit or the second output circuit, or both, from providing power; and
    a logic circuit coupled to the first microcontroller and to the second microcontroller, wherein the logic circuit is configured to enable control of a first safety switch and of a second safety switch by either the first microcontroller or by the second microcontroller, and wherein the logic circuit comprises an XOR logic gate,
    wherein the protection circuitry is connectable to a vehicle power network and to a vehicle communication network; and
  one or more storage units coupled to the at least one protection circuitry for receiving electric power to be stored in the one or more storage units,
  wherein the at least one vehicle component is connectable to at least two storage units to enable a redundant electric power supply.

6. A commercial vehicle comprising a system for providing redundant electric power according to claim 5.

7. A method for protecting a vehicle power supply, the vehicle power supply comprising storage units, the method comprising the steps of:
  providing power through at least a first output circuit and a second output circuit to the storage units; and
  interrupting the power supply through the first output circuit or through the second output circuit, or through both, based on a control by a first microcontroller or a second microcontroller, wherein a logic circuit comprising an XOR logic gate is coupled to the first microcontroller and to the second microcontroller and is configured to enable control of a first safety switch and of a second safety switch by either the first microcontroller or by the second microcontroller to interrupt the power supply.

* * * * *